(12) United States Patent
Venkata Prasad Palipi Kandubai et al.

(10) Patent No.: US 9,041,959 B2
(45) Date of Patent: May 26, 2015

(54) DISTRIBUTING CONTENT VIA A CLOUD PRINT DEVICE

(71) Applicant: HEWLETT-PACKARD DEVELOPMENT COMPANY, L.P., Houston, TX (US)

(72) Inventors: Raghavendra Venkata Prasad Palipi Kandubai, Bangalore (IN); Priyadharshni Uthirapathi, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/866,081

(22) Filed: Apr. 19, 2013

(65) Prior Publication Data

US 2014/0313541 A1    Oct. 23, 2014

(51) Int. Cl.
*G06F 15/00* (2006.01)
*G06K 15/00* (2006.01)
*G06K 15/02* (2006.01)

(52) U.S. Cl.
CPC ........ *G06K 15/4005* (2013.01); *G06K 15/1828* (2013.01)

(58) Field of Classification Search
CPC .......................... G06F 3/1296; H04N 1/00204
USPC ................................. 358/1.13–1.15
See application file for complete search history.

(56) References Cited

U.S. PATENT DOCUMENTS

| | | |
|---|---|---|
| 6,509,974 B1 | 1/2003 | Hansen |
| 7,580,139 B2 | 8/2009 | Oba |
| 7,580,943 B2 | 8/2009 | Sakura et al. |
| 7,810,040 B2 | 10/2010 | Mori et al. |
| 7,925,682 B2 | 4/2011 | Moore et al. |
| 8,019,792 B2 | 9/2011 | Morooka |
| 8,077,344 B2 | 12/2011 | Kurata |
| 8,335,762 B2 | 12/2012 | Gbadegesin et al. |
| 2005/0237564 A1* | 10/2005 | Sugimoto ................... 358/1.15 |
| 2006/0143185 A1* | 6/2006 | Kuroyanagi ................... 707/10 |
| 2011/0205586 A1 | 8/2011 | Takahashi et al. |

OTHER PUBLICATIONS

"HybridCloud Access and Storage", 2013, pp. 1-13, Egnyte, Inc., Available at: <egnyte.com/file-server/online-file-server-features.html>.
Hewlett-Packard Development Company, L.P., "HP Digital Sending Software 4," Data sheet, Jun. 2012, <http://www8.hp.com/h20195/v2/GetPDF.aspx%2F4AA0-7272ENW.pdf>.
Hewlett-Packard Development Company, L.P., "HP Digital Sending Software V4," Software Technical Reference (Public), 2005, <http://h20566.www2.hp.com/hpsc/doc/public/display?docId=emr_na-c00433124-3&docLocale=>.

* cited by examiner

*Primary Examiner* — Saeid Ebrahimi Dehkordy (57) ABSTRACT

A system and method for content notification via a cloud print device are disclosed. In one example, a document storage entity is registered with the cloud print device using a label, a device identification number and/or a located destination address. A subscriber device is registered, for the document storage entity, with the cloud print device using a device identification number, a location identification address and/or an associated email identification. A notification is sent to the registered subscriber device in response to content placement in the document storage entity.

20 Claims, 5 Drawing Sheets

DISTRIBUTING CONTENT VIA A CLOUD PRINT DEVICE

BACKGROUND

When a document is sent for printing to multiple users residing in different locations, the document may be stored in a folder and then shared with multiple users. Each user can use a computing device to access the shared folder and print the document by issuing a print command.

In one example, the document can be sent to the users via an e-mail message. The users may then print the document by forwarding the document to a printer which can access the document through internet or a storage medium.

BRIEF DESCRIPTION OF THE DRAWINGS

Examples of the subject matter will now be described in detail with reference to the accompanying drawings, in which.

The drawings described herein are for illustration purposes only and are not intended to limit the scope of the present disclosure in any way.

DETAILED DESCRIPTION

A system and method for distributing content via a cloud print device are disclosed. In the following detailed description of the examples of the present subject matter, references are made to the accompanying drawings that form a part hereof, and in which are shown by way of illustration specific in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present is defined by the appended claims.

The term "document storage entity" refers to a folder or an application, residing in a computing device that acts as a storage medium for storing electronic documents. Further, the term "content provider" refers to a user who creates the document storage entity and places content/electronic documents in the document storage entity. The term "cloud print device" refers to a device hosted on the cloud network, to support printing on a subscriber device. The subscriber device has the ability to directly communicate with the cloud print device to fetch the content in the document storage entity. Furthermore, the term "subscriber" refers to a user who is subscribed with the cloud print device to receive the content placed in the document storage entity.

Figure 1:
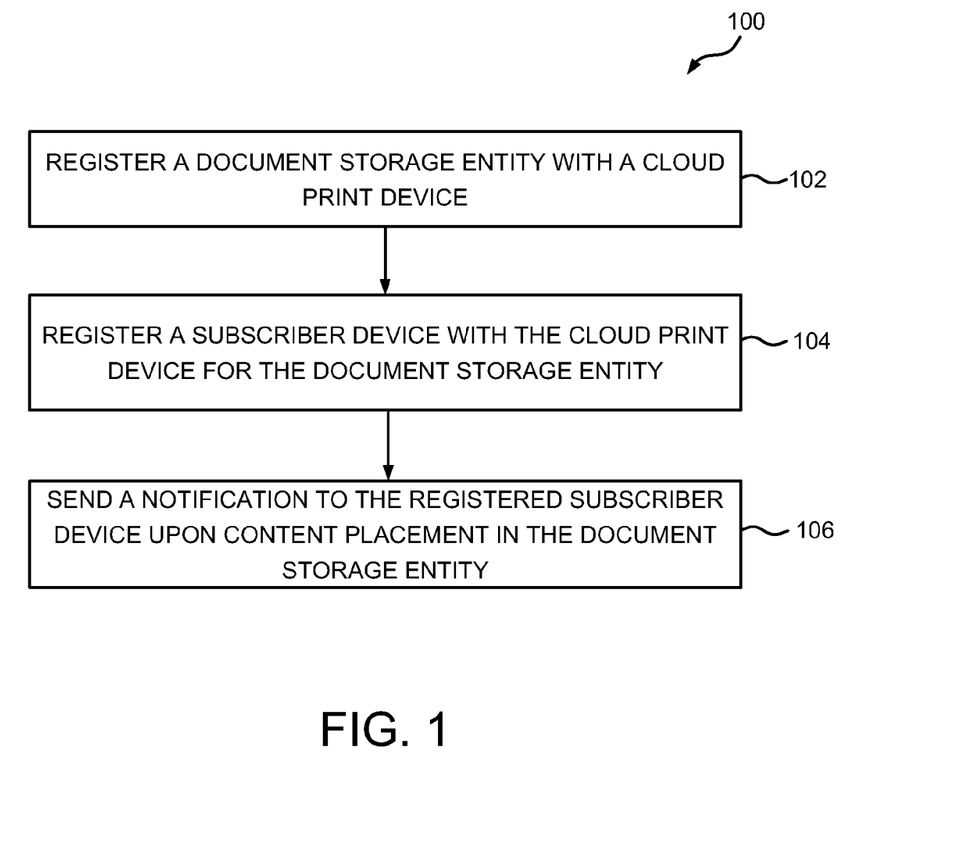
FIG. 1 illustrates a flow diagram of an example method for content notification to a subscriber via a cloud print device, according to an embodiment.

FIG. 1 illustrates a flow diagram 100 of an example method for content notification to a subscriber via a cloud print device, according to an embodiment. The document storage entity is created in a computing device by a content provider. At block 102, the document storage entity is registered with the cloud print device using a label (e.g. a folder name), a device identification number (e.g. a device serial number) and/or a located destination address (e.g. an IP (Internet Protocol) address). In one example, the document storage entity is created in a content provider computing device by a content provider and the document storage entity is then registered with the cloud print device. Registering the document storage entity may include, providing sharing permission to a folder by providing a network folder path of the folder and the folder name, a device serial number and IP address, to the cloud print device. The network folder path may act as a label to identify the document storage entity. This is explained in more detail with reference to FIG. 2.

In another example, the document storage entity is created in the cloud print device by the content provider and the document storage entity is then registered with the cloud print device. In this context, registration implies providing the network path of the document storage entity and the folder name, the device serial number and IP address to the cloud print device such that the device can access the documents placed in the document storage entity. This is explained in more detail with reference to FIG. 3.

At block 104, a subscriber device is registered for the document storage entity, with the cloud print device. In one example, the subscriber device may already be registered with the cloud print device by a manufacturer or by a user of the device. The previously registered subscriber device may then be subscribed to the document storage entity using the cloud print device at the initiation of the subscriber or the content provider. In an example implementation, the subscriber device is registered with the cloud print device using a device serial number, an IP address and/or an associated email identification. For example, the subscriber device includes an electronic device, a desktop computing device, a mobile computing device, a digital notebook, a web-connected printer and the like. In one example, registering the subscriber device, such as a web-connected printer includes providing the network address of the printer to the cloud print device. The network address includes but is not limited to the IP address and port of the printer. In another example, the cloud print device may require the subscriber printer to register with any unique attribute of the printer like a MAC address or email identification. This is explained in more detail with reference to FIGS. 2 and 3.

At block 106, a notification is sent to the registered subscriber device in response to content placement in the document storage entity. In an example implementation, the cloud print device may periodically poll the document storage entity for any new content or software running on the content provider computing device may detect the new content and alert the cloud print device. Upon detecting the new content in the document storage entity, the cloud print device sends the notification to the registered subscriber device. Example notification sent by the cloud print device, includes alerts such as print, save, dismiss, remind, replace, and the like. The content placed in the document storage entity may be distributed to the registered subscriber devices based on the alerts selected by the subscriber. In one example implementation, the content is placed in the document storage entity residing in the content provider computing device by the content provider. Further, the cloud print device sends the notification including alerts to a user interface of the registered subscriber device. Furthermore, the content placed in the document storage entity is distributed to the subscriber device based on the alerts selected by the subscriber. This is explained in more detail with reference to FIG. 2.

In another example implementation, the content is placed in the document storage entity residing in the cloud print device by the content provider. Further, the cloud print device sends the notification including the alerts to the user interface of the registered subscriber device. Furthermore, the content placed in the document storage entity is distributed to the subscriber device based on the alerts selected by the subscriber. This is explained in more detail with reference to FIG. 3.

Figure 2:
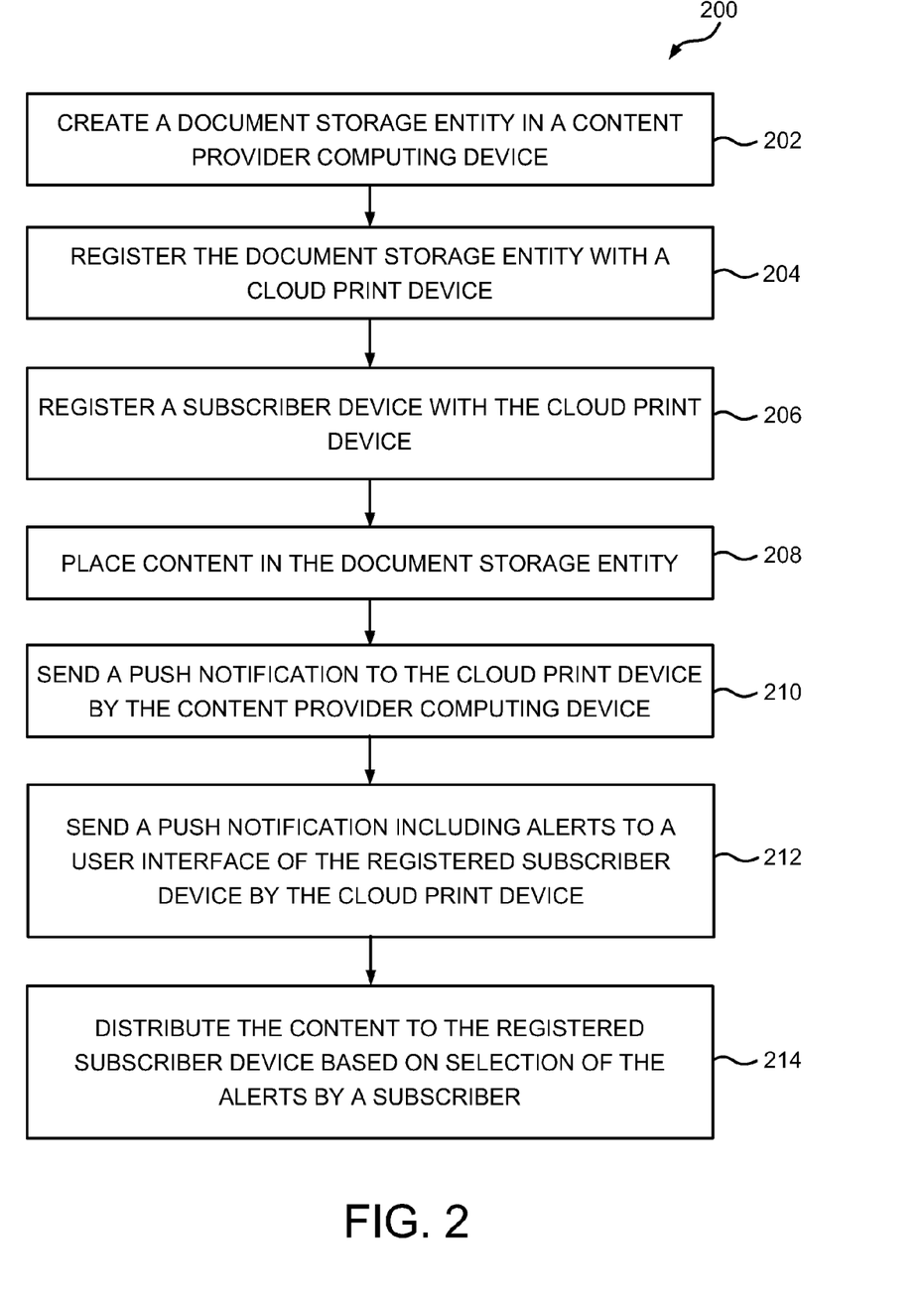
FIG. 2 illustrates another flow diagram of an example method for distributing content to a subscriber via a cloud print device, according to an embodiment.

FIG. 2 illustrates another flow diagram 200 of an example method for distributing content to a subscriber via a cloud print device, according to an embodiment. At block 202, a document storage entity is created in a content provider computing device by a content provider. For example, the content provider computing device includes one of an electronic device, a desktop computing device, a mobile computing device, a digital notebook and the like. In one example, document storage entities are created for various categories, such as sports, education, entertainment and the like. At block 204, the document storage entity may be registered with the cloud print device using a label like sports, education, etc along with a device identification number and/or a located destination address. For example, the device identification number includes a device serial number and the like. Further, the located destination address includes an Internet protocol (IP) address, a network folder path and the like.

At block 206, a subscriber device is registered for the document storage entity with the cloud print device. In one example, the subscriber device is registered with the cloud print device for a specific category by using the label in the document storage entity, the device identification number (e.g., MAC address), the location identification address (e.g., IP address, port and domain name) and/or an associated email identification. For example, if a subscriber is interested in content related to sports, then the subscriber device is registered with the cloud print device for the document storage entity in a sports category.

In an example, a mobile computing device is registered with the cloud print device for the document storage entity using a phone number or through an email identification used for authenticating an application on that mobile computing device. Further, a web-connected printer is registered with an email identification or an IP address or MAC address of the printer. Furthermore, a desktop computing device is registered with an IP address. The registration of the subscriber device allows the cloud print device to send the notification to the subscribed device in response to new content available in the document storage entity.

In another example, a group is created in the cloud print device when the content provider registers the document storage entity with the cloud print device. Further, the subscriber device is added to the group by the content provider and/or by the subscriber associated with the subscriber device. Furthermore, the cloud print device maintains a database that includes mapping information between the registered document storage entity and the subscriber device.

At block 208, the content is placed in the document storage entity residing in the content provider computing device. For example, the content includes text files, image files and the like. In one example, content related to education is placed in a document storage entity in an education category. At block 210, a notification is sent to the cloud print device from the content provider computing device upon placing the content in the document storage entity. For example, the notification notifies availability of the content in the content provider computing device to the cloud print device. In another example implementation, the cloud print device uses a mechanism to determine the availability of the content in the document storage entity registered with the cloud print device.

At block 212, a notification is sent to a user interface of the registered subscriber device by the cloud print device. Example notification sent to devices include a dialog box displaying alerts such as print, save, dismiss, remind, replace, and the like. At block 214, the content is distributed to the registered subscriber device based on selection of the alerts by the subscriber. The subscriber may select one of the alerts displayed on the user interface of the subscriber device. For example, a subscriber may initiate printing of content by selecting the print alert, then the cloud print device sends the content to the web-connected printer associated with the subscriber. The subscriber may then specify settings such as, number of copies, black and white/color and the like. If the subscriber selects to save the content, the content is then saved for a predefined time specified by the subscriber on the cloud print device for later use and retrieval. If the subscriber selects to dismiss the content, the notification sent to the user interface of the subscriber device is ignored. If the subscriber selects to remind, the subscriber will be reminded of the content at a later time specified by the subscriber. Further, if the subscriber selects an alert 'replace', the cloud print device replaces previously saved content with the content placed in the document storage entity.

Figure 3:
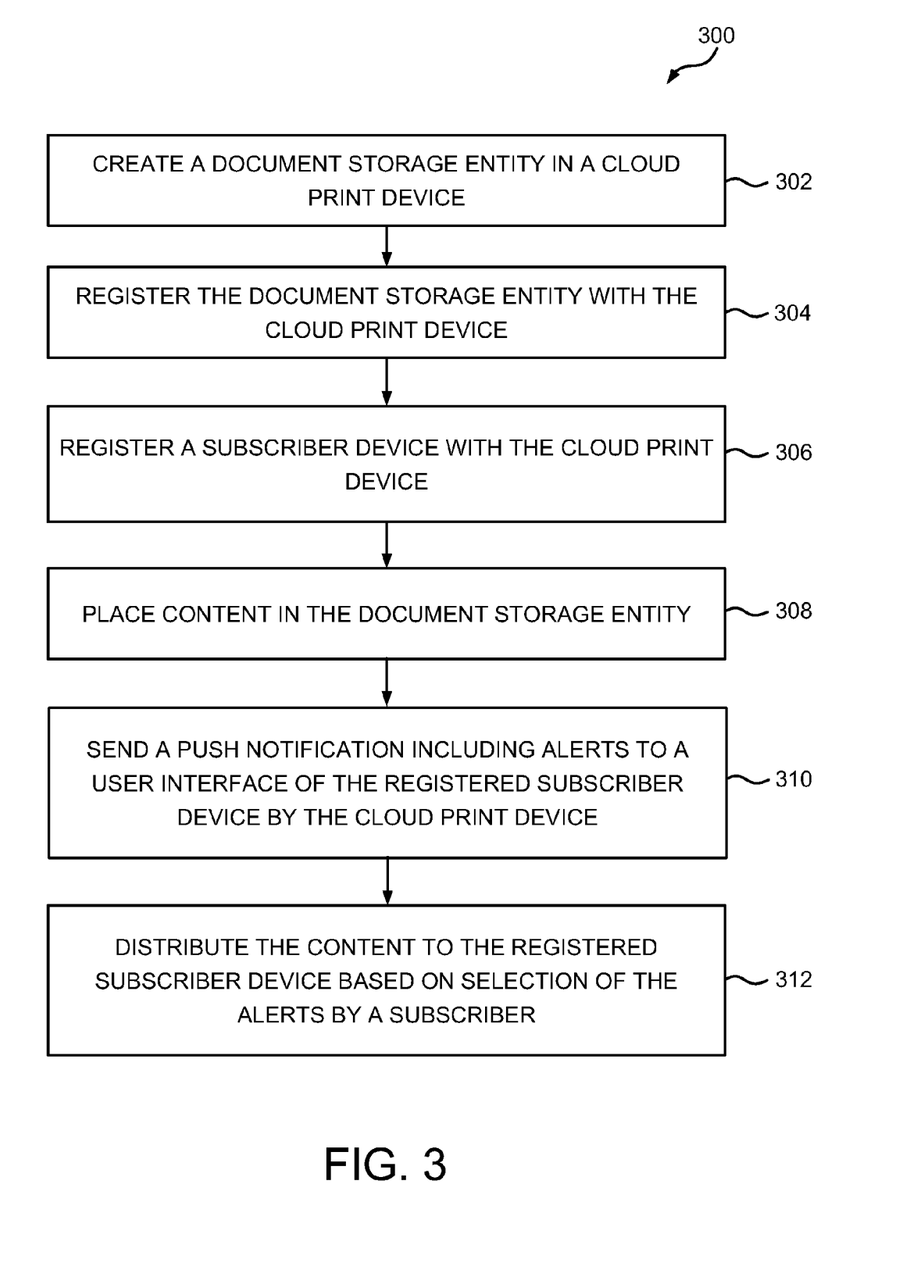
FIG. 3 illustrates yet another flow diagram of an example method for distributing content to a subscriber via a cloud print device, according to an embodiment.

FIG. 3 illustrates yet another flow diagram 300 of an example method for distributing content to a subscriber via a cloud print device, according to an embodiment. At block 302, a document storage entity is created in the cloud print device by a content provider. At block 304, the document storage entity is registered with the cloud print device using a label, a device identification number and/or a located destination address. The located destination address may include the network path to the document storage entity. For example, the content provider provides the network path and a folder name, a device serial number and location IP address to the cloud print device for registering the document storage entity residing on the content provider computing device.

At block 306, a subscriber device is registered, for the document storage entity, with the cloud print device. In one example, the subscriber device is registered with the cloud print device using a device identification number, a location identification address (for example, IP address) and/or an associated email identification. In an example, a previously registered subscriber device may also be subscribed, for the document storage entity, through the cloud print device. The device may be subscribed using a device identification number, a location identification address (for example, IP address) and/or associated email identification.

At block 308, the content is placed in the document storage entity residing in the cloud print device. Example content includes text files, image files and the like. At block 310, a notification is sent to a user interface of the registered subscriber device by the cloud print device in response to the content placement in the document storage entity. Example notifications sent to the subscriber device includes alerts such as print, save, dismiss, remind, replace, and the like.

At block 312, the content is distributed to the registered subscriber device based on selection of the alerts by the subscriber. For example, the subscriber can initiate printing of the content by selecting the print alert displayed on the user interface of the subscriber device. Then the cloud print device prints the content via the subscriber device.

Figure 4:
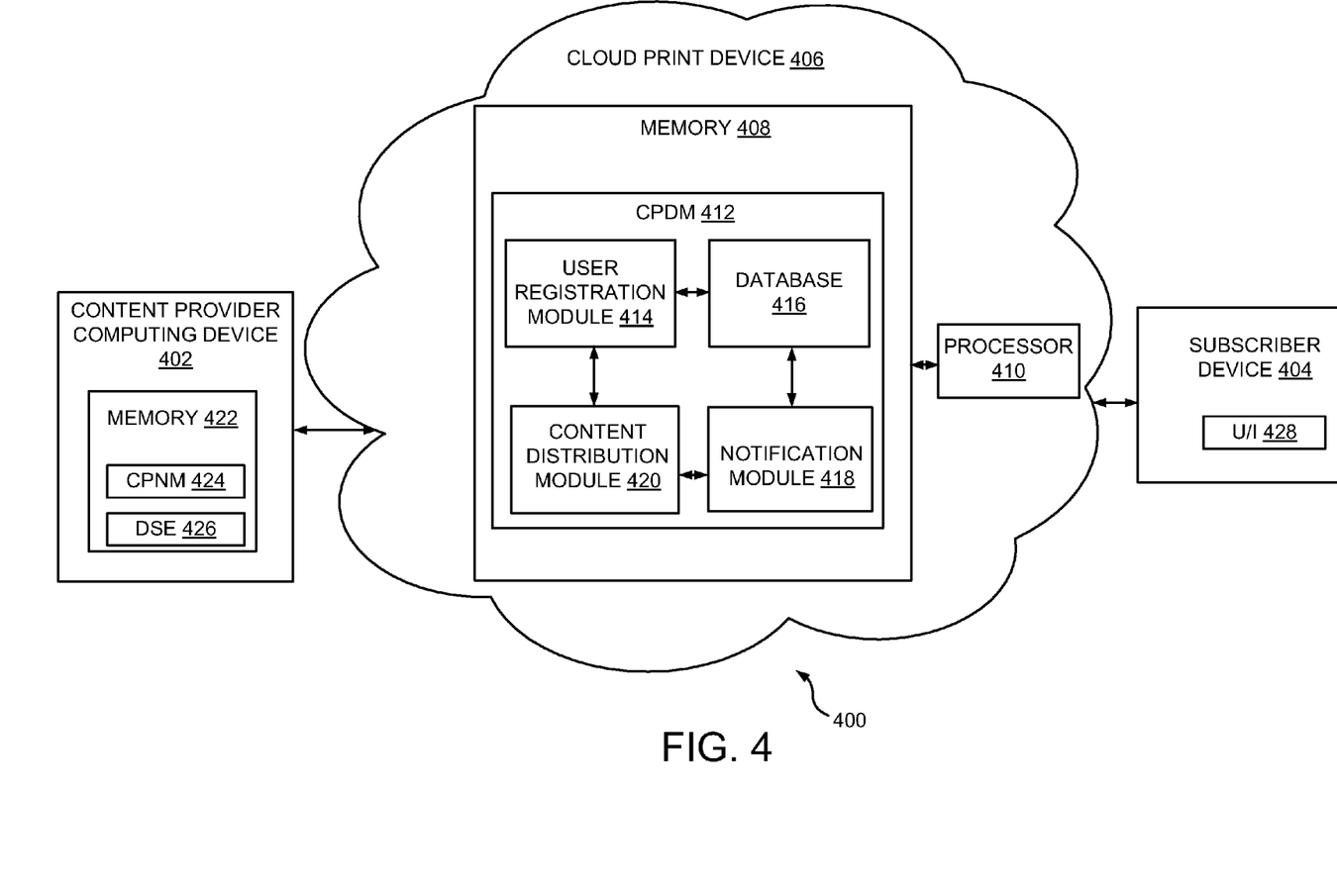
FIG. 4 shows a system, including components, for distributing content to a subscriber, using processes described in FIGS. 1 and 2, according to an embodiment.

FIG. 4 shows a system 400, including components, for distributing the content to a subscriber, using processes described in FIGS. 1 and 2, according to an embodiment. As shown in FIG. 4, the system 400 includes a content provider computing device 402, a subscriber device 404 and a cloud print device 406. Further, the content provider computing device 402 includes a memory 422. Furthermore, the memory 422 includes a document storage entity (DSE) 426 and a content provider notification module (CPNM) 424.

Further, the subscriber device 404 includes a user interface (U/I) 428. Furthermore, the cloud print device 406 includes memory 408 and a processor 410. The memory 408 includes a cloud print device module (CPDM) 412. Further, the CPDM 412 includes a user registration module 414, a database 416, a notification module 418, and a content distribution module 420.

As shown in FIG. 4, the cloud print device 406 is communicatively coupled to the content provider computing device 402 and the subscriber device 404. The process is explained below with respect to the content provider computing device 402.

In operation, a content provider creates the DSE 426 in the content provider computing device 402. Further, the user registration module 414 enables to register the DSE 426 with the cloud print device 406 using a label, a device identification number and/or a located destination address. For example, the content provider provides one of a network path to access the document storage entity and a folder name, a device serial number and IP address, to the cloud print device 406 for registering the DSE 426.

Furthermore in operation, the user registration module 414 registers the subscriber device 404 with the cloud print device 406 for the DSE 426. The subscriber device 404 is registered with the cloud print device 406 using a device identification number, a location identification address (e.g., an IP address) and/or an associated email identification. In this case, the database 416 maintains a database that includes mapping information between the registered DSE 426 and registered subscriber device 404.

Moreover in operation, the content provider places the content in the DSE 426 residing in the content provider computing device 402. For example, the content includes text files, image files and the like. In one example implementation, the CPNM 424 sends a notification to the cloud print device 406 when the content is placed in the DSE 426. For example, the notification notifies availability of the content in the content provider computing device 402 to the cloud print device 406. In another example implementation, the CPDM 412 uses a mechanism to dynamically determine the availability of the content in the DSE 426 when the content is placed in the DSE 426. In either case, the cloud print device 406 obtains the content from the content provider computing device 402 and saves the content in a storage space associated with the cloud print device 406. This ensures that the content is safe from deletion before the subscriber responds to a notification from the cloud print device 406.

Further, the notification module 418 sends a notification to the U/I 428 of the subscriber device 404 registered for the DSE 426. Example notification sent to the U/I 428 of the registered subscriber device 404 displays a dialog box including alerts, such as print, save, dismiss, remind, replace, and the like. The content distribution module 420 distributes content to the registered subscriber device 404 based on selection of the alerts displayed on the U/I 428. In this case, the subscriber can select one of the alerts displayed on the U/I 428 of the subscriber devices 404. Then the cloud print device 406 processes the content according to the chosen alert.

Figure 5:
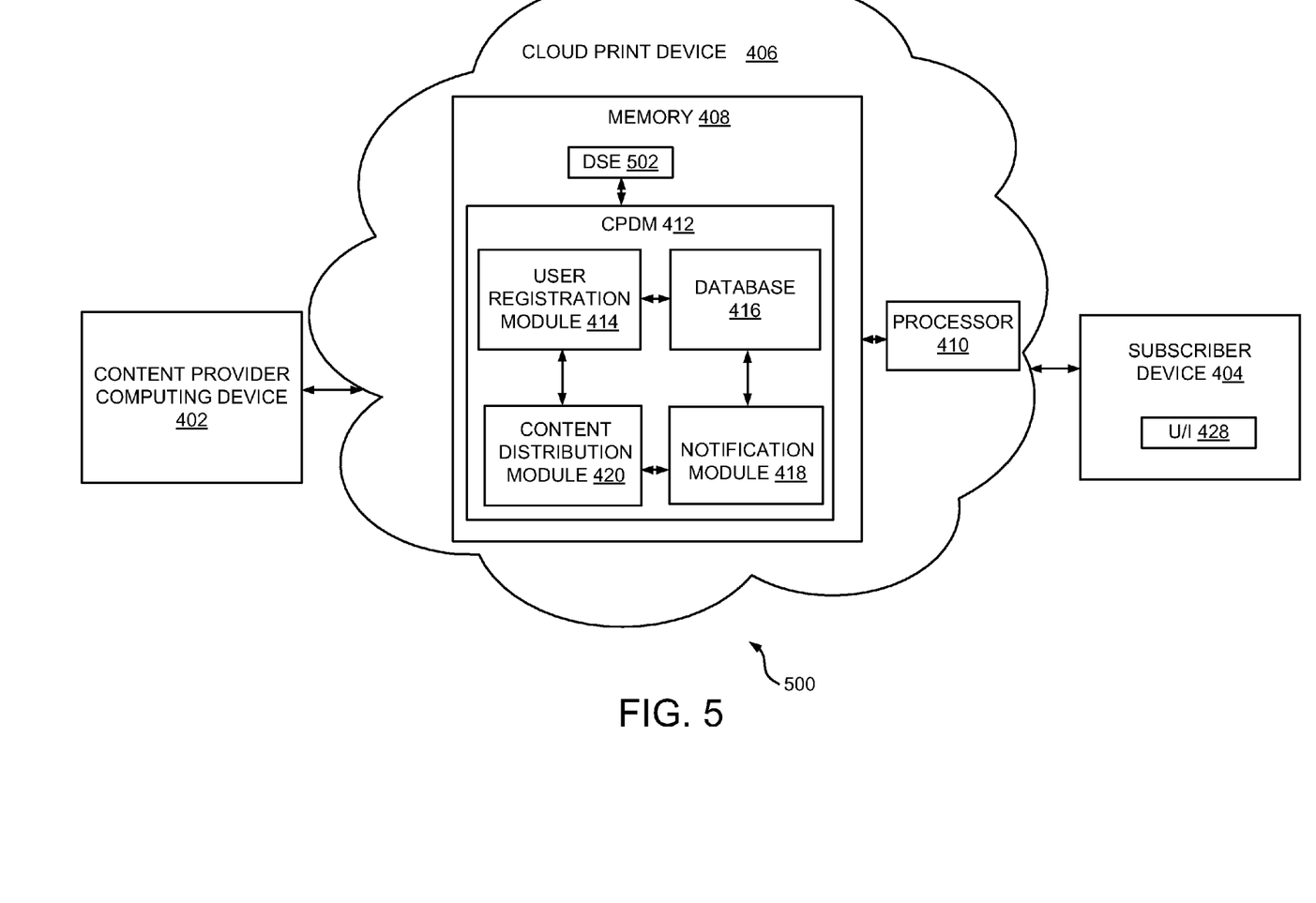
FIG. 5 shows another system, including components, for distributing the content to the subscriber, using processes described in FIGS. 1 and 3, according to an embodiment.

FIG. 5 shows another system 500, including components, for distributing the content to the subscriber, using processes described in FIGS. 1 and 3, according to an embodiment. As shown, the system 500 of FIG. 5 is similar to that of FIG. 4 except a DSE 502 created in the cloud print device 406.

In operation, the user registration module 414 enables the content provider to create and register the DSE 502 with the cloud print device 406 using a label, a device identification number and/or a located destination address. The user registration module 414 further registers the subscriber device 404 with the cloud print device 406 for the DSE 502. Furthermore, the notification module 418 sends a notification to the U/I 428 of the subscriber device 404 that is registered for the DSE 502 when the content is placed in the DSE 502. Example notification sent to the U/I 428 of the registered subscriber device 404 displays a dialog box including alerts, such as print, save, dismiss, remind, replace, and the like. The content distribution module 420 distributes the content to the registered subscriber device 404 based on selection of the alerts displayed on the U/I 428.

In various examples, system and method described in FIGS. 1 through 5 simplifies printing of a document by directly notifying the registered subscriber device that the document is available for printing. Further, the subscriber will have freedom to take printing decisions and to select the printing properties. Furthermore, the above described systems and methods can also send the content directly to printers based on content provider and subscriber relationships. For example, a school teacher can drop the homework document in a folder in a school's computer and the document may be instantly available for printing on all the web connected printers which are registered to the cloud print device and for the folder.

For example, the CPNM 224 and CPDM 412 described above may be in the form of instructions stored on a non transitory computer readable storage medium. An article includes the non transitory computer readable storage medium having the instructions that, when executed by the processor 410 or computing device, causes the processor 410 or computing device to perform the one or more methods described in FIGS. 1-5.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:
1. A method comprising:
registering a document storage entity with a cloud print device using at least one of a label for the document storage entity, a device identification number for the document storage entity and a located destination address for the document storage entity;
registering a subscriber device, for the document storage entity, with the cloud print device using at least one of a device identification number, a location identification address and an associated email identification; and
sending a notification to the registered subscriber device in response to each content placement in the document storage entity.
2. The method of claim 1, further comprising:
creating the document storage entity in a content provider computing device or in the cloud print device.

3. The method of claim 2, wherein sending the notification to the registered subscriber device comprises:
   placing content in the document storage entity residing in the content provider computing device by a content provider for distributing to the registered subscriber device;
   sending a notification to the cloud print device upon placing the content in the document storage entity by the content provider computing device; and
   sending the notification to a user interface of the registered subscriber device by the cloud print device in response to receiving the notification from the content provider computing device.

4. The method of claim 3, wherein the notification sent to the user interface of the registered subscriber device comprises alerts selected from the group consisting of print, save, remind, replace, and dismiss.

5. The method of claim 4, wherein the content placed in the document storage entity is distributed to the registered subscriber device based on the alerts selected by a subscriber associated with the registered subscriber device.

6. The method of claim 2, wherein sending the notification to the registered subscriber device comprises:
   placing content in the document storage entity residing in the content provider computing device by a content provider for distributing to the registered subscriber device;
   determining that the content is placed in the document storage entity residing in the content provider computing device by the cloud print device; and
   sending the notification to a user interface of the registered subscriber device by the cloud print device in response to content placement in the document storage entity residing in the content provider computing device.

7. The method of claim 2, wherein sending the notification to the registered subscriber device comprises:
   placing content in the document storage entity residing in the cloud print device by a content provider for distributing to the registered subscriber device; and
   sending the notification to a user interface of the registered subscriber device by the cloud print device in response to content placement in the document storage entity.

8. The method of claim 1, wherein registering the subscriber device comprises at least one of:
   adding the subscriber device for the document storage entity by a content provider; and
   registering the subscriber device for the document storage entity by a subscriber associated with the subscriber device.

9. The method of claim 1, wherein the content provider computing device is selected from the group consisting of an electronic device, a desktop computing device, a mobile computing device, and a digital notebook.

10. The method of claim 1, further comprising:
    registering a plurality of document storage entities with the cloud print device.

11. The method of claim 10, wherein registering the subscriber device further comprises:
    registering the subscriber device, for one of the plurality of registered document storage entities, with the cloud print device.

12. A system comprising:
    a content provider computing device;
    a subscriber device; and
    a cloud print device communicatively coupled to the content provider computing device and the subscriber device, wherein the cloud print device comprises:
    memory; and
    a processor coupled to the memory, wherein the memory includes a cloud print device module (CPDM) to:
      register a document storage entity with the cloud print device using at least one of a label, a device identification number and a located destination address;
      register the subscriber device, for the document storage entity, with the cloud print device using at least one of a device identification number, a location identification address and an associated email identification;
      send a notification to the registered subscriber device in response to content placement in the document storage entity;
      receive a response to the notification from the registered subscriber device; and
      initiate, in response to the received response, printing of the content in the document storage entity via the registered subscriber device in response to the sent notification.

13. The system of claim 12, wherein the content provider computing device includes a content provider notification module (CPNM) to send a notification to the CPDM upon placing the content in the document storage entity residing in the content provider computing device and wherein the CPDM sends the notification to a user interface of the registered subscriber device in response to receiving the notification from the CPNM.

14. The system of claim 12, wherein the CPDM sends the notification to a user interface of the registered subscriber device upon placing the content in the document storage entity residing in the cloud print device.

15. The system of claim 12, wherein the CPDM is to register a plurality of document storage entities with the cloud print device; and
    to register the subscriber device, the CPDM is to register the subscriber device, for one of the plurality of registered document storage entities, with the cloud print device.

16. A non-transitory computer-readable storage medium having instructions that, when executed by a computing device cause the computing device to:
    register a document storage entity with a cloud print device using at least one of a label for the document storage entity, a device identification number for the document storage entity and a located destination address for the document storage entity;
    register a subscriber device, for the document storage entity, with the cloud print device using at least one of a device identification number, a location identification address and an associated email identification; and
    send a notification to the registered subscriber device in response to placement of content in the document storage entity, regardless of a type of the content placed in the document storage entity.

17. The non-transitory computer-readable storage medium of claim 16, wherein the instructions further cause the computing device to:
    create the document storage entity in a content provider computing device;
    send a notification to the cloud print device upon placing the content in the document storage entity residing in the content provider computing device by the content provider computing device; and
    send the notification to a user interface of the registered subscriber device by the cloud print device in response to receiving the notification from the content provider computing device.

18. The non-transitory computer-readable storage medium of claim 16, wherein the instructions further cause the computing device to:
- create the document storage entity in the cloud print device;
- place the content in the document storage entity residing in the cloud print device by the content provider for distributing to the registered subscriber device; and
- send the notification to a user interface of the registered subscriber device by the cloud print device in response to placing the content in the document storage entity.

19. The non-transitory computer-readable storage medium of claim 16, wherein the instructions further cause the computing device to:
- register a plurality of document storage entities with the cloud print device.

20. The non-transitory computer-readable storage medium of claim 19, wherein the instructions to register the subscriber device, for the document storage entity, with the cloud print device further cause the computing device to:
- register the subscriber device, for one of the plurality of registered document storage entities, with the cloud print device.

* * * * *